United States Patent [19]
Blanc-Rosset

[11] Patent Number: 5,984,347
[45] Date of Patent: Nov. 16, 1999

[54] ACCESSORY IN THE FORM OF AN ATTACHÉ CASE FOR MOTOR VEHICLE

[76] Inventor: André Blanc-Rosset, 43, rue Guy Moquet, 75017-Paris, France

[21] Appl. No.: 08/863,247

[22] Filed: May 27, 1997

[51] Int. Cl.⁶ ...................................................... B60P 1/43
[52] U.S. Cl. ...................... 280/727; 312/235.8; 224/275; 224/561; 297/146; 297/188.06
[58] Field of Search .................................. 280/727, 728.1; 312/235.8; 220/482; 224/539, 275, 540, 561, 560, 567, 545; 297/146, 163, 164, 169, 188.06, 188.04, 188.01

[56] References Cited

U.S. PATENT DOCUMENTS

| | | | |
|---|---|---|---|
| 2,697,479 | 12/1954 | Fesler | 312/235.8 |
| 3,876,247 | 4/1975 | Chilewich | 297/188.06 |
| 3,951,486 | 4/1976 | Tracy | 224/275 |
| 4,466,659 | 8/1984 | Carpentier et al. | 297/146 |
| 4,757,928 | 7/1988 | Browne | 224/275 |
| 4,792,183 | 12/1988 | Townsend, III | 297/163 |
| 5,046,433 | 9/1991 | Kramer et al. | 108/44 |
| 5,226,576 | 7/1993 | Ellsworth | 224/561 |
| 5,813,354 | 9/1998 | Scott | 108/44 |

Primary Examiner—Christopher P. Ellis
Attorney, Agent, or Firm—Rines and Rines

[57] ABSTRACT

An attaché case type accessory is provided for motor vehicles or the like having at least two seats arranged one behind the other, the front seat 2 having a head-rest 10 or the like. The accessory is adapted to be removably mounted to the back of the front seat 2 so as to form a functional platform for a passenger sitting on the back seat. The attaché case accessory includes a casing 20, a rigid frame 22 and a stabilizing means 24. The attaché case type accessory is rotatably mounted about a shaft 30 so that it can be, in a non-use position, in a substantially vertical plane, and; in use position, in a substantially horizontal plane. The upper portion of the rigid frame 22 is suspended by a suspending and height adjustment means to the vertical supports of the head-rest 10 of the front seat 2. The stabilizing means comprises a pair of arms 24 that engage the back 4 of the seat so as to adjust and maintain the accessory in its substantially horizontal and vertical planes respectively.

25 Claims, 3 Drawing Sheets

ACCESSORY IN THE FORM OF AN ATTACHÉ CASE FOR MOTOR VEHICLE

BACKGROUND OF THE INVENTION

The present invention relates to an independent accessory in the form of an attaché case for a motor vehicle or equivalent that provides passengers sitting in the back of the vehicle with a removable platform for eating, reading, writing and the like.

It is known that the backrests of the seats of certain types of vehicles contain, as original equipment, simple folding shelves, the use of which is limited. If such a shelf is to maintain a horizontal position when open, whatever the angle at which the backrest of the seat to which it is fitted is set, the shelf must be connected to rigid posts attached to the base of the seat. This requires a very specific and very heavy design of the seat itself, and is the reason why such shelves are generally only found in trains and aeroplanes.

However, there are documents describing devices more specifically designed for use in a motor vehicle. For example, document FR-A-2 529 061 reports a "supporting tray for various activities for passengers inside a vehicle". The tray possesses a height-adjustable leg arrangement, on the base of which the passenger places his or her feet in order to keep the device steady. This device provides a horizontal tray, or at any rate a tray parallel to the base of its leg arrangement. The device is not therefore fixed, and the user has an active and permanent role in keeping it steady. In the absence of a user tall enough to place his or her feet on the base, the device becomes quite unusable. It is, furthermore, very cumbersome.

Document GB-A-2 239 639 relates to a folding tray consisting of two plates that can be unfolded so that one is placed against the seat backrest. The structure is fixed rigidly to the posts of the headrest of the seat; consequently, the level of the tray is at the top of the backrest of the corresponding seat, which is not practical for use as a meal tray or writing surface. Moreover, its horizontality is not defined and the tray has to be locked manually into the use position by tightening a number of small wheels working by angular friction. The possibility that the wheels might be loosened by the vibrations of the vehicle is not envisaged. In addition the amount of time required for fitting and removal remains very long.

Document FR-A-2 707 570 discloses a "travel tray" which is fixed in place by means of the posts of a headrest. A fixing system allows the tray to adopt a vertical position or a horizontal position. The movable part of the tray may include parts intended for holding objects, such as a bottle. This device is fixed in a flexible way by means of the posts of the seat headrest. A strap is passed around the front of the seat in question in order to steady the device. The horizontality of the open tray is therefore defined only with respect to the angle of the backrest of the seat with the vertical, which means not only that the device is not interchangeable (because not adjustable), but also that the angle of the backrest cannot be modified by the person sitting on the seat to which the device is fitted.

Document U.S. Pat. No. 5,269,229 relates to a folding tray in which the horizontal distance (when the tray is opened) to the user can be adjusted for the convenience of the latter. To this end, the tray, when horizontal, can be slid approximately horizontally into or out of an approximately vertical frame. In addition, even though this tray is an added accessory, it is still more or less unremovable, or at any rate removable with great difficulty. Furthermore, the horizontality of the tray cannot be adjusted to take account of the inclination of the seat to which it is fixed.

Document GB-A-2 029 346 discloses, for its part, a conventional attaché case which is fixed by rigid extensible arms to the top of the backrest of the seat in front, and likewise forms a meal tray container. The removability of the attaché case is linked to the prior presence of the arms, which include a plurality of fixing screws making any manipulation complicated. Also, the horizontality of the tray cannot be adjusted to suit the inclination of the seat, because it is made horizontal only by means of a predetermined fixed convexity of the lid of the attaché case.

Document DE-U-92 05 820 relates to a rustic removable tray that has no lid of any kind, and the horizontality of which is not guaranteed. No provision appears to be made for putting the tray in a vertical position, and it has to be removed completely before it can be folded.

It is an object of the present invention to obviate the various drawbacks mentioned above.

There are many other documents known in the field of meal trays. For example, documents U.S. Pat. No. 5,421,459 and FR-A-2 628 516, among others, disclose trays with wells normally used for in-flight meals and for fast food. Similarly, document U.S. Pat. No. 3,049,374 relates to a container device for a meal tray fixed to the front seat. This device, in more or less conventional use in aeroplanes, cannot be removed at all. Generally speaking, these trays are used in conjunction with the folding shelves mentioned earlier and their only purpose is to help with serving in a somewhat unstable environment.

SUMMARY OF THE INVENTION

The invention therefore relates to an accessory in the form of an attaché case for a motor vehicle or equivalent having at least two seats, one behind the other, termed the front seat and the rear seat, the front seat being fitted with a headrest or equivalent; the accessory is intended to be fitted removably to the backrest of the front seat in such a way as to form a practical platform for the use of a passenger sitting on the rear seat. This accessory in the form of an attaché case essentially comprises a housing, a rigid frame and a stabilizing means.

This accessory in the form of an attaché case must therefore be usable whatever the angle of inclination of the backrest of the front seat, and whatever vehicle is used. It must also be inexpensive so as to have domestic applications, and must be adaptable to any type of vehicle.

According to the invention, the housing is mounted rotatably on a hinge pin running along the rear edge of the housing and along the lower part of the rigid frame, so that it can either be in an approximately vertical plane, in the non-use position, or be in an approximately horizontal plane approximately perpendicular to the plane of the rigid frame, in the use position. The upper part of the rigid frame is hung by a hanging and height-adjustment unit from the posts of the headrest of the front seat. The stabilizing means consists of a pair of length-adjustable arms designed to rest on the backrest of the front seat to enable the planes to be adjusted and kept approximately horizontal and vertical, respectively.

Preferably, the housing is hollow in such a way as to create a compartment capable of accommodating, for example, a snugfitting removable inner tray optionally having wells of different shapes. A lid, which may for example be mounted rotatably on a hinge pin parallel to that of the housing, may advantageously enable the compartment to be closed.

A supplementary fixing means may optionally connect the accessory to a part of the front seat in order to keep the accessory stable under all conditions.

BRIEF DESCRIPTION OF THE DRAWINGS

The invention will be understood more clearly, and other objects, advantages and features thereof will become more obvious, on reading the following description of preferred embodiments, provided without implying any limitation, to which three sheets of drawing are attached, in which.

DETAILED DESCRIPTION OF THE PREFERRED EMBODIMENTS

Figure 1:
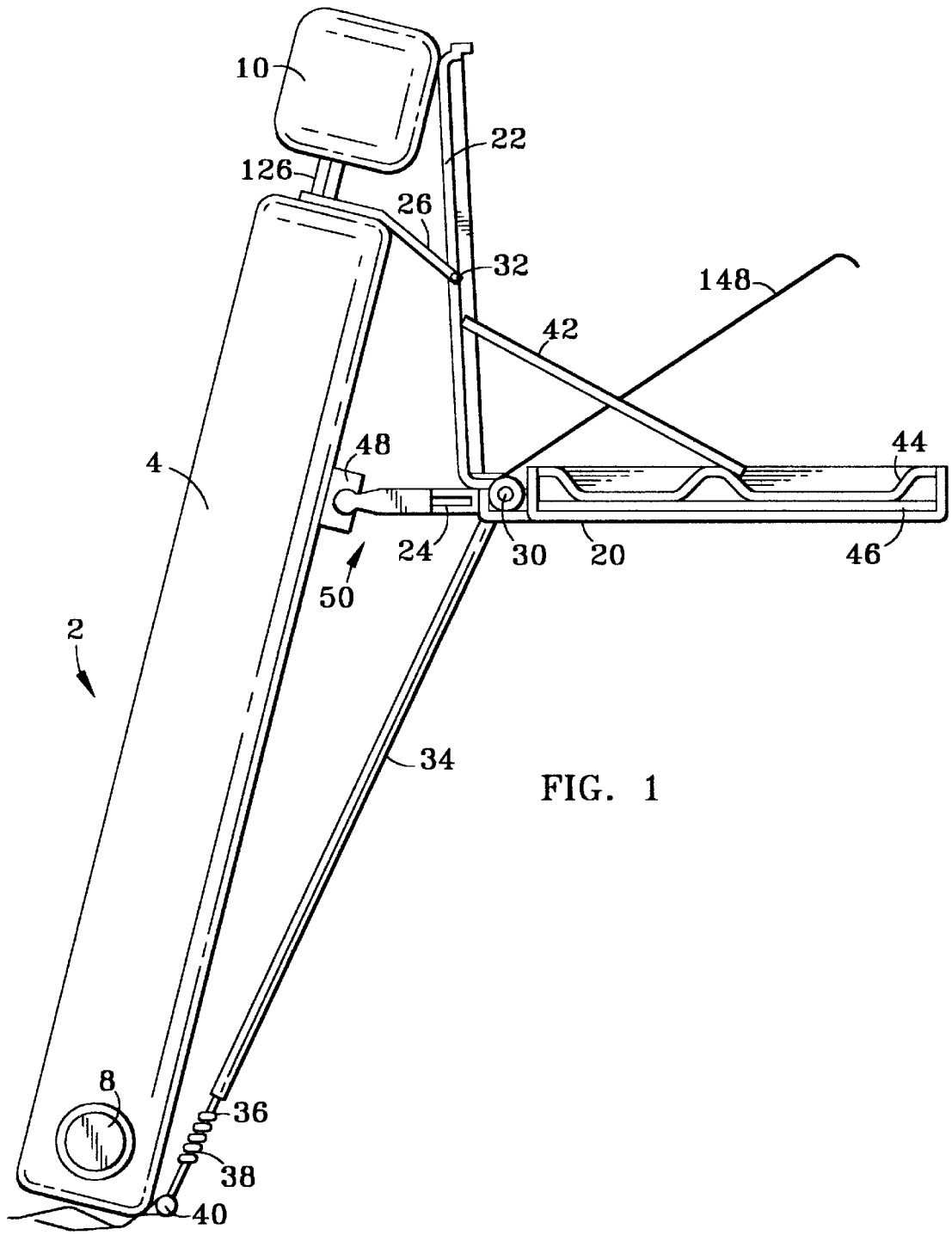
FIG. 1 shows diagrammatically in section an accessory in the form of an attaché case in accordance with the invention, with its housing in the use position, fitted to the backrest of a front seat.
Figure 2:
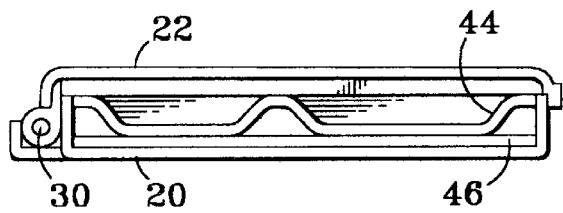
FIG. 2 shows diagrammatically in section the accessory of FIG. 1 when closed.

Referring now to the figures, these show diagrammatically an accessory in the form of an attaché case according to the teachings of the invention, and more particularly in FIG. 1, the front seat 2 comprises a backrest 4 whose angle of inclination with respect to its approximately horizontal part can be modified by turning a wheel 8. Headrests 10 are provided at the top of the backrest 4 to which they are connected by posts 126. The rear seat on which the user of the accessory is to sit is not shown, for the sake of clarity.

The accessory in the form of an attaché case essentially comprises a housing 20, a rigid frame 22, a hanging and height-adjustment unit and a stabilizing means. The stabilizing means, housed in the sides of the housing 20, consists of a pair of retractable arms 24 that rest firmly on the rear face of the backrest 4 of the front seat 2.

The hanging and height-adjustment unit of the accessory, which may for example be a cord 26 (or equivalent) enables the accessory to be hung on the posts 126 of the headrest 10. The length of the cord 26 is such that the accessory can still be removed, that is to say it can be taken off the headrest 4. The length of this cord is preferably adjustable in order that the height at which the accessory is used can be adjusted to suit the height and/or wishes of the user. For example, the point of attachment 32 of the cord to the frame 22 may be mounted on a rail (not shown) enabling it to be slid along a certain length, as a means of achieving this purpose. Alternatively, the cord may be attached in such a way that it can be slid in a groove formed in the frame 22, in which case several possible points of attachment of the cord to the frame will be provided. As another alternative, one end of the cord may be wound around a reel with a braked control wheel attached to the frame 22.

Figure 4:
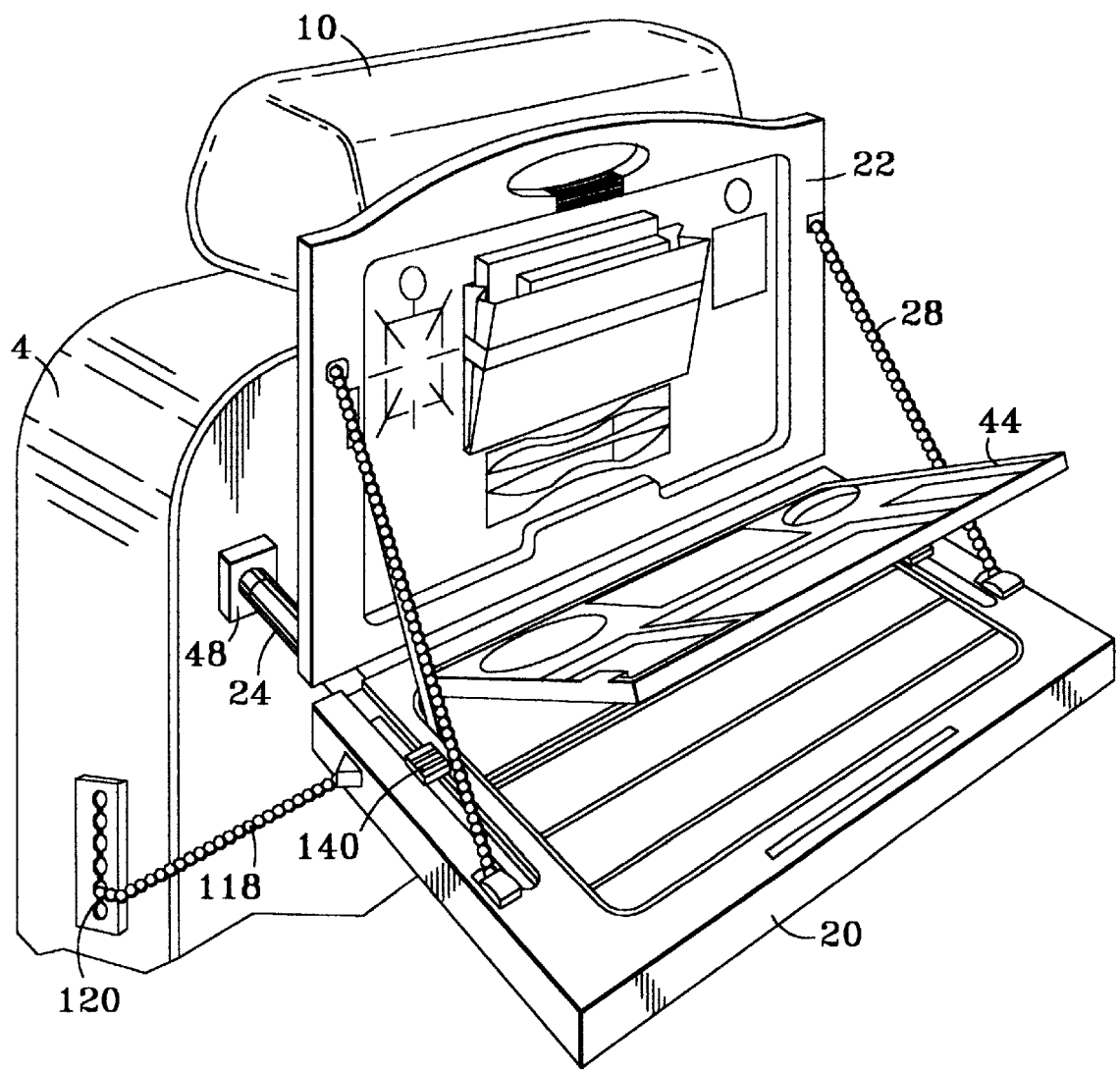
FIG. 4 shows, in perspective and open, an embodiment of the accessory in the form of an attaché case according to the invention.
Figure 5:
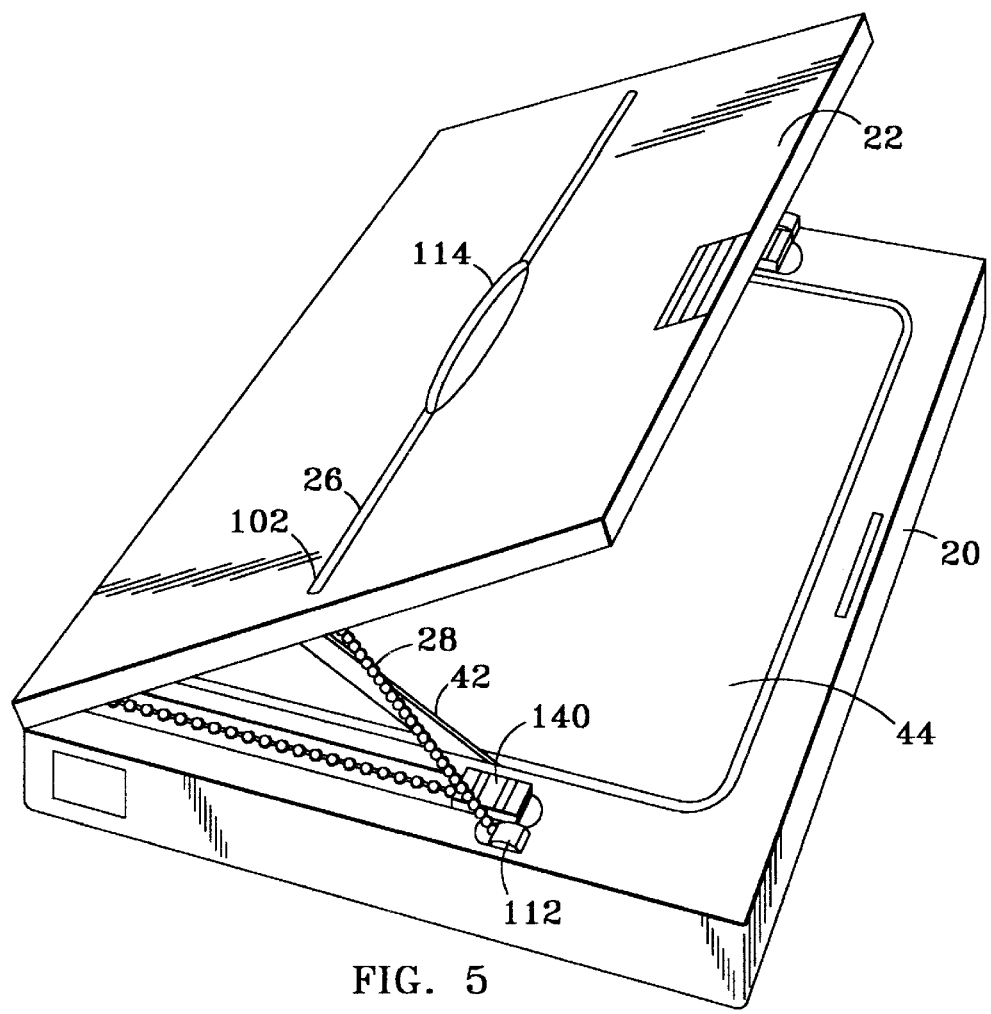
FIG. 5 shows, in perspective and partially closed, an embodiment of the accessory according to the invention.
Figure 6:
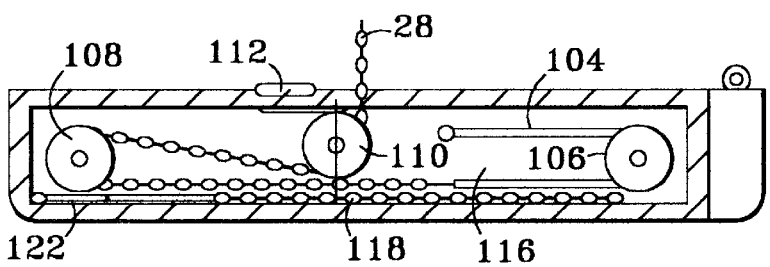
FIG. 6 shows diagrammatically in section a preferred embodiment of the hanging and height-adjustment unit of the accessory.

One preferred embodiment of such a hanging unit is partially illustrated, in section, in FIG. 6 with reference to the embodiment depicted in FIGS. 4 and 5. The unit here is retractable and the cord 26 is continued on either side by a chain 28 comprising a plurality of closely spaced beads. An elastic means 104 that continues each chain 28 returns the whole to its rest position via a plurality of pulleys 106, 108 and 110, by which means the chain 28 can be stored in the side chambers 116 provided for this purpose in the housing, when the accessory in the form of an attaché case is closed, as well as allowing the chain to pass through at a variable angle when the accessory in the form of an attaché case is open. A locking fork 112 attached to the housing 20 can be moved to lock the chain 28 in position between two adjacent beads. The user can thus easily open the resulting attaché case, and grasp the knob 114 (FIG. 5), carefully concealed with the cord 26 in a groove 102 formed on the outer face of the rigid frame 22 in which they are accommodated, in order to pass the cord over the headrest 10, and then lock the accessory at the desired height by means of the locking fork 112, simply by moving the latter. Closing the accessory is simply the same operation in reverse, since the elastic means 104 will return each chain 28 to its corresponding chamber 116 provided on the side walls of the housing 20. It should be noted that such locking forks associated with the chains of closely spaced beads give great precision when adjusting the height of the accessory.

Figure 7:
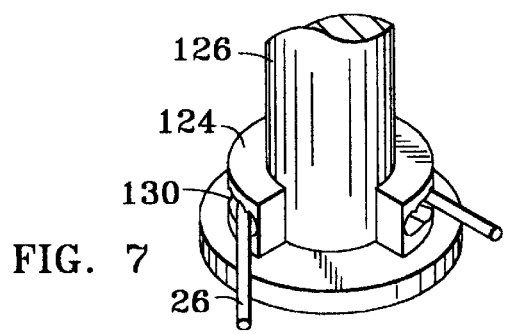
FIG. 7 shows a way of fixing the unit to the headrest.

Whether the cord 26 is continued and/or replaced by a bead chain 28 or is formed by a conventional cord, it may be useful, for the sake of greater stability of the device, for it to be fixed firmly to the headrest and unable to slide around the posts of the latter. To this end, as illustrated in FIG. 7, a ring 124 may be fitted to at least one of the posts 126 of the headrest 10. Such a ring forms a groove 130 that clamps the cord 26 when the latter is inserted into it. The groove 130 may advantageously present a plurality of teeth for this purpose, as shown in FIG. 7, or a series of constrictions.

It will thus be seen that the outer face of the rigid frame 22 also contributes to the stability of the accessory since it provides a surface of light contact with the rear faces of the headrest 10 and/or of the upper part of the backrest 4. Thus, the hanging unit generates, when the cord 26 is slung around the posts 126 of the headrest 10, a force tending to press the outer face of the rigid frame 22 against the abovementioned rear faces. It is also advantageous that the contact surface of the outer face be slightly rough, e.g. granular, so as to contribute to good adhesion.

In one embodiment of the invention, though not obligatory for the implementation of the accessory, in order to give extra stability, a supplementary fixing means may advantageously connect a lower part of the accessory to a lower part of the front seat 2 as shown in FIG. 1. This supplementary fixing means comprises, for instance, a strap 34 extended by a spring means 36, and comprises at its end a spring hook (or equivalent) 38 engaging with a ring 40 fixed underneath or to the seat 2. This supplementary fixing means has the advantage of keeping the accessory in the correct position when the vehicle in which it is being used is moving.

In a preferred alternative embodiment illustrated in FIG. 4, this supplementary fixing means connects the side chambers 116 of the housing 20 to the backrest 4 of the front seat 2. It comprises, for instance, two retractable straps each consisting of, for example, a chain 118 of closely spaced beads, the end bead of which fits into a corresponding keeper 120 fixed to, for example, the side of the backrest 4 of the front seat. Such a keeper will advantageously consist of a graduated plate 120 which has been previously attached to the lateral uprights of the backrest 4 of the front seat 2. Obviously, an elastic means 122 (FIG. 6) is provided in order to exert a corresponding stabilizing force on the accessory and to return the straps into their respective housings after use. It is clearly preferable to use here two such chains 118 each stored in its own side chamber 116 of the housing 20. A locking means (not shown), which may also be of the movable fork type, may advantageously be provided to fix the required length of each chain 118 and keep it in tension as a means of further enhancing the stability of the accessory.

The housing 20 is mounted so as to rotate about a hinge pin 30 situated along the rear edge of the housing 20 and of the lower part of the rigid frame 22. It can thus adopt a first position termed the non-use position, in which the housing 20 and the frame 22 are in parallel and approximately vertical planes, and a second position termed the use position in which the planes of the frame 22 and housing 20 are approximately perpendicular. A stay means 42, preferably consisting of a rigid, automatically locking notched bar, the particular purpose of which is to prevent the accessory from being closed unintentionally, may advantageously determine the maximum functional angle of opening of the accessory. Such a bar can of course be slid along and disengaged by simple finger pressure. This stay means 42 is not, however, a necessity, since this maximum angle of opening can also be determined by means of stops appropriately provided on the pivot pin 30, and/or by displacement of the fork 112 if the cord 26 is of the chain type as described earlier.

The housing 20 is preferably sufficiently hollow to form a compartment capable of holding a variety of types of equipment to suit the precise purpose of the accessory in the form of an attaché case.

In the Figures, a removable inner tray 44 fits snugly into the housing 20. The bottom 46 of the compartment may, for example, be coated with a non-slip material and/or exhibit transverse grooves, The inner tray 44 is advantageously provided with recessed wells for holding a plate, spoon, fork, knife and glass, in a version intended as a meal box (see FIG. 4), but it may also have wells for holding pens, pencils, rubber and paper, in a version for use as a writing desk or mini-office. Preferably only one face of this inner tray 44 has wells, the other face being flat. This gives the inner tray 44 the advantage of being fully reversible, one face being usable as a writing or reading desk, the other as a meal shelf.

Underneath this inner tray 44, or when this inner tray 44 is not present, the compartment may advantageously hold a portable microcomputer, a mobile telephone, electronic games, magazines and newspapers, etc. Wells may be provided for this purpose. A cavity is also provided, for example along the rear edge of the housing 20, for an electric battery or a series of cells. It will be appreciated that the wells in the inner tray 44 and/or in the compartment may be in a variety of shapes to suit the essential use of the accessory.

A lid 148 (FIG. 1) may also be provided to close the compartment thus created. This lid 148 is either removable, or mounted rotatably on a hinge pin parallel to that of the housing 20, or rotatably on this hinge pin 30, as shown in FIG. 1.

The inner tray 44 is preferably removable, but it may also be mounted on a corresponding hinge to allow free access to the abovementioned compartment. A fixing means, such as magnetic blocks or the like may in either case be used advantageously to keep the inner tray 44 in an approximately vertical position against the inner face of the rigid frame 22.

A levelling means is advantageously built into the periphery of the housing 20 to allow fine adjustment of at least one of the vertical and horizontal planes. This may take the form of any conventional means, such as a spirit level. This gives the user a simple extra amenity which may be found to be very useful, for example when he or she wishes to place a full glass on the housing.

Adjustments to the horizontality (or verticality) of the housing 20 are made by means of the stabilizing means. This means consists of two stabilizing arms 24 of variable length designed to project, as illustrated in FIG. 4, from the side walls of the housing 20 and rest on the backrest 4 of the front seat 2. A means of adjustment and locking (140 in FIGS. 4 and 5), such as a clamping wheel, a series of studs or a slide, enables the length to be adjusted and fixed. Advantageously, when retracted, the arms 24 compress a spring means (not shown) which will help with installing the housing 20 later.

Figure 3:
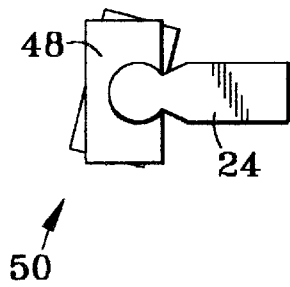
FIG. 3 shows diagrammatically in section the remote free end of an arm used in implementing the invention.

A shoe 48, which may have a non-slip surface, is preferably provided at the remote free end of each stabilizing arm 24 so as not to damage the rear face of the backrest 4 of the front seat 2. The shoe 48 is advantageously mounted on the remote free end of the arm 24 by a ball joint means illustrated diagrammatically in FIG. 1 or in FIG. 3, under the reference 50, so that it can adapt itself to the backrest 4. An equivalent means to this ball joint means may be used, such as a helical spring in which the turns are in contact with each other.

In one embodiment, the accessory in the form of an attaché case according to the invention, when closed, has a length of between 45 and 60 cm, a width of between 25 and 30 cm, and a depth of between 5 and 8 cm approximately. The essential parts of this accessory are produced, for example, by injection of a rigid plastics material, and in such a way that the corners and edges of the housing are rounded for safety reasons.

In an example of the mini-office type in which the accessory in the form of an attaché case contains a portable computer and/or a mobile telephone, or if it includes a lighting device, battery means or any other device running on electricity, an electrical lead capable of being connected to the battery of the vehicle may advantageously be provided in order to provide electrical power to the accessory.

As can be seen, the accessory in the form of an attaché case according to the invention obviates the drawbacks of the prior art and affords the significant advantages cited earlier, including ease of use and great stability. It can be used whatever the angle of inclination of the backrest 4 of the front seat 2; it is fully removable, easy to handle and can be stored with ease when not in use; furthermore, it can be used as a simple attaché case outside the vehicle; it is also stable under all conditions of use; and, lastly, it costs little and is simple to manufacture.

Although the illustrations and description have been of what are currently considered the preferred embodiments of the present invention, it will be obvious that a person skilled in the art will be able to make a variety of changes and modifications to it without departing from the scope of the present invention as defined hereinbelow.

For example, for elementary reasons of safety, it may be envisaged that the hinge pin 30 may be an easily breakable pin that breaks immediately in the event of a crash if the case is open, thus protecting the potential user. In the same spirit, the front edge of the attaché case may contain an airbag that inflates automatically in the event of a crash, in order likewise to ensure that the housing 20 cannot become a dangerous object that might give the user a rib injury.

For example, a handle may be provided on the housing 20 as well as on the frame 22. Such a handle may advantageously form an angle with respect to the general plane of the accessory in the form of an attaché case in order to come near to the plane of the vertical force produced by the weight of the accessory.

Another example: as indicated, hanging hooks may be provided on the posts 126 of the headrests 10, which hooks support the cord 26, so facilitating the installing of the accessory in the form of an attaché case and reducing the amount of cord used. Conversely, the hooks may be attached to the cord 26 and used to grip the posts 126 of the headrests 10.

Another example: the bottom 46 of the compartment may be constructed so as to slide in the manner of a drawer in order to augment, during its use, the width of the accessory in the form of an attaché case.

Another example: a trigger button may be provided on the inside of the compartment for automatic fast return of the retractable arms 24 of the stabilizing means.

It is clear that the accessory in the form of an attaché case described above can be installed or removed very easily without requiring special tools or any specific expertise, nor requiring an unreasonable amount of time. Moreover, the accessory in the form of an attaché case may, especially when in the form of a mini-office, be used outside of any vehicle and is not dependent upon the latter. Lastly, it is compatible with virtually all types of motor vehicles.

What I claim is:

1. An accessory in the form of an attaché case for a motor vehicle or equivalent having at least two seats, one behind the other, termed the front seat and the rear seat, said front seat being fitted with a headrest or equivalent, said accessory being intended to be fitted removably to the backrest of said front seat in such a way as to form a practical platform for the use of a passenger sitting on said rear seat, and essentially comprising a housing, a rigid frame and a stabilizing means, wherein said housing is mounted rotatably on a hinge pin running along a rear edge of said housing and along a lower part of said rigid frame, so that it can either be in an approximately vertical plane, in the non-use position, or be in an approximately horizontal plane approximately perpendicular to the plane of said rigid frame, in the use position;

the upper part of said rigid frame is hung by a hanging and height-adjustment unit from the posts of said headrest (10) of said front seat; and said stabilizing means consists of a pair of length-adjustable arms designed to rest firmly on the rear face of the backrest of said front seat to enable said planes to be adjusted and kept approximately horizontal and vertical, respectively.

2. The accessory according to claim 1, wherein said housing is hollow in such a way as to create a compartment capable of accommodating a variety of types of equipment.

3. The accessory according to claim 2, wherein said compartment accommodates a snug-fitting removable inner tray.

4. The accessory according to claim 3, wherein said inner tray has wells of different shapes.

5. The accessory according to claim 3, comprising a means for fixing said inner tray against the inner face of said rigid frame.

6. The accessory according to claim 2, wherein said hollow housing comprises an additional lid enabling said compartment to be closed.

7. The accessory according to claim 6, wherein said additional lid is mounted rotatably on a hinge pin parallel to or coinciding with that of said housing.

8. The accessory according to claim 1, wherein said hanging and height-adjustment unit and said stabilizing means are at least partly housed in side chambers in said housing.

9. The accessory according to claim 2, wherein said hanging and height-adjustment unit consists at least partly of chains, with elastic means returning said unit to its rest position via a plurality of pulleys.

10. The accessory according to claim 9, wherein said chain consists of a plurality of closely spaced beads, at least one locking fork attached to said housing being able to be moved between two adjacent beads in order to lock said chain in a taut position after said accessory has been opened.

11. The accessory according to claim 8, wherein a transverse groove is formed across the outer face of said rigid frame that rests on said backrest in order to accommodate said cord and optionally a knob with which to grasp the latter.

12. The accessory according to claim 1, wherein a ring is fitted to at least one post of said headrest, which ring forms a groove that clamps said cord when the latter is inserted into it.

13. The accessory according to claim 1, wherein a remote free end of each of said arms is provided with a shoe having a contact surface for contact with the rear face of the backrest of said front seat, said shoe being mounted by a ball joint or equivalent on said is remote free end.

14. The accessory according to claim 1, wherein at least one supplementary fixing means connects said accessory to a part of said front seat or of the backrest thereof.

15. The accessory according to claim 14, wherein said supplementary fixing means comprises at least one strap extended by a spring means, one end of which is designed to attach to said front seat.

16. The accessory according to claim 15, wherein said fixing means comprises two straps that retract into said side chambers, each having one end that fits into a corresponding keeper fixed to the side of the backrest of said front seat.

17. The accessory according to claim 16, wherein said straps consist of chains of closely spaced beads, with a locking means optionally being provided to fix its length.

18. The accessory according to claim 1, wherein a levelling means is built into said housing to allow fine adjustment of at least one of said approximately vertical and horizontal planes.

19. The accessory according to claim 1, wherein said rigid frame forms a lid for said housing when the accessory is in the non-use position.

20. The accessory according to claim 1, wherein a rigid stay means connects said frame and said housing in order to determine the maximum functional angle of opening between them.

21. The accessory according to claim 1, wherein an electrical lead capable of being connected to the battery of said vehicle is provided in order to provide electrical power to the electrically operated devices included in said accessory.

22. The accessory according to claim 1, wherein said hinge pin is a breakable pin that breaks in the event of a crash if said accessory in the form of an attaché case is open.

23. The accessory according to claim 1, wherein the front lateral edge of said accessory is capable of containing an airbag that inflates automatically in the event of a crash.

24. The accessory according to claim 2, wherein the bottom of said compartment is mounted so as to slide in the manner of a drawer.

25. Accessory according to claim 1, wherein it is provided with a handle fixed to the housing or to the frame and forming a specific angle with respect to the general plane of said accessory.

* * * * *